Sept. 4, 1928.
W. F. CREMEAN
DUSTGUARD
Filed Aug. 14, 1926
1,683,449
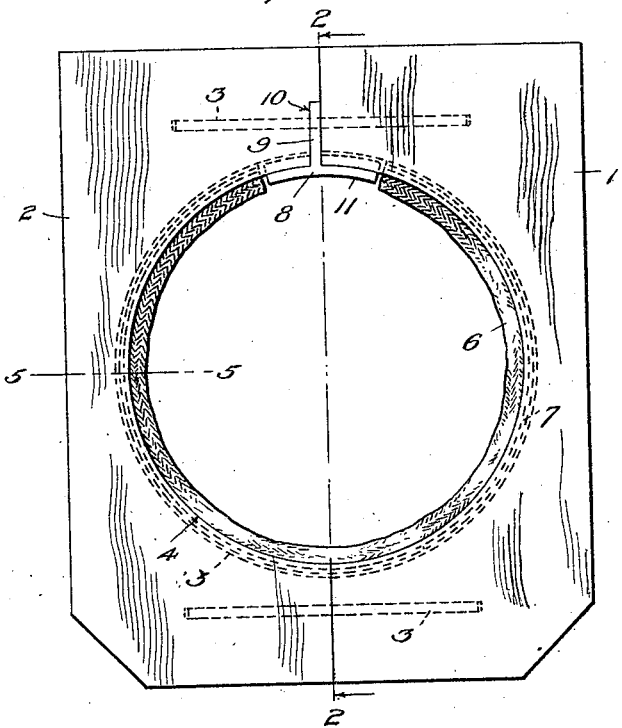
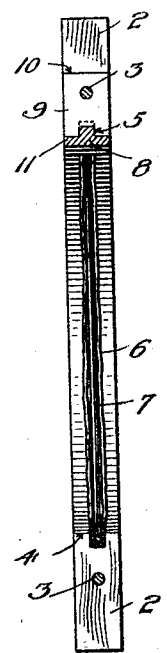
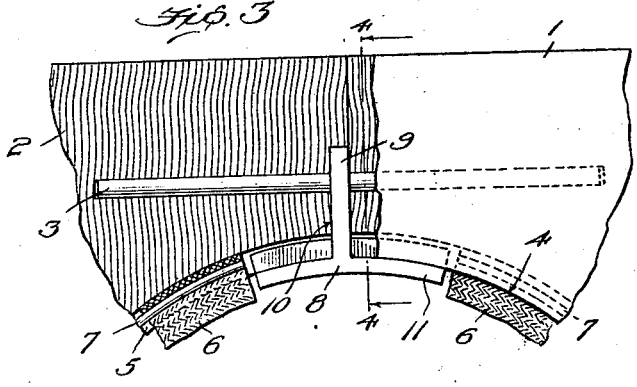
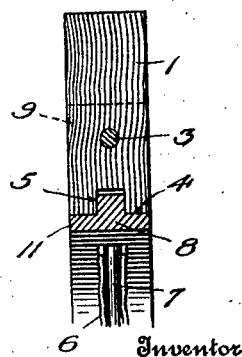
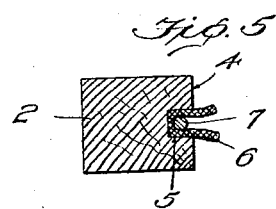
Inventor
William F. Cremean
By Ritter & Mechlin
His Attorneys Patented Sept. 4, 1928.

1,683,449

UNITED STATES PATENT OFFICE.

WILLIAM F. CREMEAN, OF TOLEDO, OHIO.

DUST GUARD.

Application filed August 14, 1926. Serial No. 129,175.

My invention relates to dust guards for car axles. The principal object of the invention is to provide a device of this character which efficiently performs its intended purpose, which is durable in service and may be easily manufactured.

The principal feature of the invention, generally stated, consists in forming the body of the dust guard with an axle receiving opening which is of larger diameter than the dust guard journal of the axle, and in providing flexible means bordering the margin of the opening and projecting inwardly toward the center of the latter for engagement with the said dust guard journal, a resilient expansion ring which is arranged in a groove formed in the dust guard body at the margin of the opening being employed for retaining the flexible means in place.

A further important feature of the invention consists in forming the body of the dust guard with an opening of larger diameter than the dust guard journal of the axle, and in providing a flexible strip bordering the margin of the opening and projecting inwardly therefrom so as to engage the dust guard journal, the flexible strip having its ends spaced apart at the top of the opening, means being provided for retaining the strip in place, and a wearing block being arranged between the ends of the flexible strip at the top of the opening in the body, the block extending inwardly towards the center of the opening for engagement with the dust guard journal.

In the drawings illustrating a preferred embodiment of the invention, the scope whereof is pointed out in the claims,—

Figure 1 is an elevational view of a dust guard embodying the invention.

Figure 2 is a sectional view thereof on the line 2—2, Fig. 1.

Figure 3 is a detail view, partly in front elevation and partly in vertical section.

Figure 4 is a detail sectional view on the line 4—4, Fig. 3.

Figure 5 is a detail sectional view on the line 5—5, Fig. 1.

In the drawings, the body of the dust guard is shown as consisting of two sections, 1 and 2, respectively, which are divided from each other on the vertical center line of the device. These body sections are preferably of wood and may be conveniently secured together by means of wire dowels 3. The dowels are preferably coated with cement before being placed in position.

The center of the dust guard is formed with a circular opening 4 which is slightly larger than the dust guard journal with which the car axle is commonly provided, and the margins of the body sections 1 and 2 bordering the axle opening are rabbeted to form a continuous circular groove or channel 5.

Secured in the groove 5 of the body of the dust guard is a strip 6 of flexible material, preferably lamp wicking or canvas webbing, which projects inwardly toward the center of the opening 4 so as to engage the dust guard journal of the axle and form a dust proof joint therewith. The inside diameter of the hole, after the strip of flexible material has been inserted should be slightly less than the size of the journal so that it will have a close fit therewith, thereby preventing any dust or dirt from working into the journal box. This strip of flexible material is preferably retained in place by a split resilient expansion ring 7 which may conveniently be made of wire. The strip 6 is preferably folded around the retaining ring 7 so that it presents two free edges projecting inwardly toward the center of the axle opening. The outward expansion of the ring 7 firmly clamps the strip of flexible material against the bottom of the groove 5 of the dust guard body.

The ends of the strip of flexible material as well as the ends of the expansion ring 7 are preferably spaced apart at the top of the opening in the dust guard, and arranged in the groove 5 between said ends is a wearing block or member 8 bridging the line of division between the body sections 1 and 2. This block is preferably made of babbitt, but may be of other suitable material, such for example as indurated fibre. The block may advantageously be secured to the body of the dust guard by providing it with an upwardly extending portion or tongue 9 through which the adjacent dowel 3 passes, the body section 2 being suitably recessed, as indicated at 10, to receive said tongue. The portion 11 of the wearing block presented to the dust guard journal is curved cylindrically to conform to said journal and projects inwardly toward the center of the opening 4 for engagement with said journal.

It will be perceived that a dust guard constructed in accordance with the invention may be easily manufactured, and it will be appreciated that the short grain sections at the top and bottom of the body of the dust guard are well reinforced by the dowels and by the expansion retaining ring fitting tightly in the groove bordering the axle receiving opening, while the wearing block at the top of the axle opening ensures long and efficient life to the dust guard.

I claim:—

1. A car axle dust guard having a body formed with an opening of larger diameter than the dust guard journal of the axle, and provided with flexible means bordering the margin of said opening and projecting inwardly toward the center of the latter for engagement with said journal, and having a resilient expansion ring retaining said flexible means in assembled relation to said body.

2. A car axle dust guard having a body formed with an opening of larger diameter than the dust guard journal of the axle, the surface of said body bordering the opening being grooved, said guard having flexible material extending into said groove and projecting beyond the margin of said opening inwardly toward the center of the latter for engagement with said journal, and having within said groove a resilient expansion ring for retaining said flexible material in place.

3. A car axle dust guard having a body formed with an opening of larger diameter than the dust guard journal of the axle, the margin of said body bordering said opening being provided with a groove, said guard having a strip of flexible material entering the groove and extending beyond the margin of the opening inwardly toward the center of the latter for engagement with said journal, and having within the groove a resilient expansion ring for retaining the strip in place, said strip being folded around the ring.

4. A car axle dust guard having a body formed with an opening of larger diameter than the dust guard journal of the axle, and provided with a flexible strip bordering the margin of said opening and projecting inwardly toward the center of the latter for engagement with said journal, said strip having its ends spaced apart at the top of said opening, said guard also having means for retaining the strip in place and being provided with a wearing block carried by said body and arranged between the ends of the flexible strip, said block projecting inwardly toward the center of the opening for engagement with said journal.

5. A car axle dust guard having a sectional body divided vertically substantially at its center and formed with an opening of larger diameter than the dust guard journal of the axle, said guard being provided with a flexible strip carried by said body and having its ends spaced apart, and being provided also with a wearing block arranged between the ends of the strip and bridging the line of division between the body sections at the top of the opening, said strip and block projecting inwardly toward the center of the opening for engagement with said journal.

6. A car axle dust guard having a sectional body divided vertically substantially at its center and formed with an opening of larger diameter than the dust guard journal, the margin of said opening being grooved, said guard being provided with a flexible strip extending into said groove and projecting inwardly toward the center of the opening for engagement with said journal, and being also provided with a resilient expansion ring positioned in the groove for holding said strip in place, and having a wearing block secured to the body at the upper part of said opening, said block being adapted to engage said journal.

In testimony whereof I affix my signature.

WILLIAM F. CREMEAN.